US008528095B2

(12) United States Patent
Haviv et al.

(10) Patent No.: US 8,528,095 B2
(45) Date of Patent: Sep. 3, 2013

(54) INJECTION CONTEXT BASED STATIC ANALYSIS OF COMPUTER SOFTWARE APPLICATIONS

(75) Inventors: Yinnon A. Haviv, Beerotaim (IL); Roee Hay, Haifa (IL); Marco Pistoia, Amawalk, NY (US); Ory Segal, Tel Aviv (IL); Adi Sharabani, Ramat Gan (IL); Takaaki Tateishi, Kanagawa-ken (JP); Omer Tripp, Har-Adar (IL); Omri Weisman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 12/825,293

(22) Filed: Jun. 28, 2010

(65) Prior Publication Data

US 2011/0321016 A1    Dec. 29, 2011

(51) Int. Cl.
*G06F 11/00* (2006.01)
*H04L 9/32* (2006.01)
*G06F 15/173* (2006.01)
*G06F 9/44* (2006.01)

(52) U.S. Cl.
USPC ............... 726/25; 726/23; 713/181; 709/224; 717/128; 717/130

(58) Field of Classification Search
USPC ...................................... 726/22–26; 713/188
See application file for complete search history.

(56) References Cited

U.S. PATENT DOCUMENTS

| 7,058,805 | B2 | 6/2006 | Sibert |
| 7,240,332 | B2 | 7/2007 | Berg et al. |
| 7,392,545 | B1 | 6/2008 | Weber et al. |
| 7,398,516 | B2 | 7/2008 | Berg et al. |
| 7,398,517 | B2 | 7/2008 | Berg et al. |
| 7,454,797 | B2 | 11/2008 | Zhu et al. |
| 7,530,101 | B2 | 5/2009 | Gallo et al. |
| 7,530,107 | B1 | 5/2009 | Ono et al. |
| 7,617,489 | B2 | 11/2009 | Peyton et al. |
| 7,661,097 | B2 | 2/2010 | Mukkavilli |
| 7,849,509 | B2 | 12/2010 | Venkatapathy et al. |

(Continued)

FOREIGN PATENT DOCUMENTS

| JP | 2007052625 A | 3/2007 |
| WO | WO2006118193 | 11/2006 |
| WO | WO2007116490 | 10/2007 |
| WO | 2008047351 A2 | 4/2008 |

OTHER PUBLICATIONS

Christensen, et al.,"Precise Analysis of String Expressions," in SAS'03 Proceedings of the Int'l Static Analysis Symposium, vol. 2695 of LNCS, pp. 1-18, 2003.

(Continued)

*Primary Examiner* — Evans Desrosiers
(74) *Attorney, Agent, or Firm* — Cantor Colburn LLP; Terry Carroll

(57) ABSTRACT

Embodiments of the invention generally relate to injection context based static analysis of computer software applications. Embodiments of the invention may include selecting a sink within a computer software application, tracing a character output stream leading to the sink within the computer software application, determining an injection context of the character output stream at the sink, where the injection context is predefined in association with a state of the character output stream at the sink, identifying any actions that have been predefined in association with the identified injection context, and providing a report of the actions.

18 Claims, 3 Drawing Sheets

(56) References Cited

U.S. PATENT DOCUMENTS

| | | | |
|---|---|---|---|
| 7,853,987 | B2 | 12/2010 | Balasubramanian et al. |
| 7,937,692 | B2 | 5/2011 | Drepper |
| 7,975,257 | B2 | 7/2011 | Fanning et al. |
| 7,987,451 | B1 | 7/2011 | Dalcher |
| 8,166,532 | B2 | 4/2012 | Chowdhury et al. |
| 2004/0260940 | A1 | 12/2004 | Berg et al. |
| 2005/0108562 | A1 | 5/2005 | Khazan et al. |
| 2006/0150160 | A1 | 7/2006 | Taft et al. |
| 2006/0277539 | A1 | 12/2006 | Amarasinghe et al. |
| 2007/0016894 | A1 | 1/2007 | Sreedhar |
| 2007/0083933 | A1 | 4/2007 | Venkatapathy et al. |
| 2007/0088740 | A1 | 4/2007 | Davies et al. |
| 2007/0150869 | A1 | 6/2007 | Tateishi et al. |
| 2008/0148061 | A1 | 6/2008 | Jin et al. |
| 2008/0184208 | A1 | 7/2008 | Sreedhar et al. |
| 2008/0244536 | A1* | 10/2008 | Farchi et al. ............. 717/130 |
| 2008/0270993 | A1 | 10/2008 | Tateishi et al. |
| 2010/0043048 | A1 | 2/2010 | Dolby et al. |
| 2010/0333201 | A1 | 12/2010 | Haviv et al. |
| 2011/0072517 | A1 | 3/2011 | Tripp |
| 2011/0078794 | A1* | 3/2011 | Manni et al. ............. 726/23 |
| 2011/0087892 | A1 | 4/2011 | Haviv et al. |
| 2011/0131656 | A1 | 6/2011 | Haviv et al. |

OTHER PUBLICATIONS

Engelfriet, et al,"MSO Definable String Transductions and Two-way Finite-State Transducers," ACM Transactions on Computational Logic, vol. 2, Issue 2 (Apr. 2001) pp. 216-254.

Emmanuel Geay, et al., "Modular String-Sensitive Permission Analysis with Demand-Driven Precision," ICSE-09, IEEE, pp. 177-187; May 2009.

James Harvey, "A Static Secure Flow Analyzer for a Sub-set of Java, "US Naval Post-Graduate School, Mar. 1998, See Abstract, pp. 1-98.

Minamide,"Static Approximation of Dynamically Generated Web Pages," Proceedings of the 14th Int'l Conference on World Wide Web, pp. 432-441, 2005.

Moller, et al., "The Pointer Assertion Logic Engine," ACM SIGPLAN vol. 36, Issue 5 (May 2001) pp. 221-231.

Abstract: JP2008060745 (A2); Title: Information Processing System and Program; Pulication Date: Mar. 13, 2008; First named inventor: Yasuhiko; Assignee: Fuji Xerox Co Ltd, 1 page.

Scott et al, "Specifying and Enforcing Application-Level Web Security Policies", IEEE, vol. 15, No. 4, 2003, http://www2.computer.org/portal/web/csdl/doi/10.1109/TKDE.2003.1208998.

Wassermann, G., et al. "Sound and Precise Analysis of Web Applications for Injection Vulnerabilities," SINGPLAN Notices, vol. 42, No. 6 (Jun. 2007), pp. 32-41.

Pietraszek, Tadeusz, et al. "Defending Against Injection Attacks Through Context-Sensitive String Evaluation," Lecture Notes in Computer Science (including subseries Lecture Notes in Artificial Intelligence and Lecture Notes in Bioinformatics). vol. 3858 LNCS (2006) pp. 124-145. Recent Advances in Intrusion Detection—8th International Symposium, RAID (2005), Revised papers.

Benjamin Livshits, "Improving Software Security with Precise Static and Runtime Analysis," Dissertation submitted to the department of computer science and the committee on graduate studies of Stanford University in partial fulfillment of the requirements for the degree of doctor of philosophy, Nov. 2006.

\* cited by examiner

INJECTION CONTEXT BASED STATIC ANALYSIS OF COMPUTER SOFTWARE APPLICATIONS

BACKGROUND

1. Field

The invention relates to computer software testing in general, and more particularly to static analysis of computer software applications.

2. Description of the Related Art

Code injection refers to the exploitation of a computer software application by an attacker whereby code is introduced into the application to change the course of execution, typically in a manner that compromises the application's data security. While static analysis techniques have been developed for identifying vulnerabilities in computer software applications to attacks of this type, more sensitive techniques are required to reduce or eliminate false positive and false negative results produced during static analysis.

SUMMARY

In one aspect of the invention a system is provided for injection context based static analysis of computer software applications, the system including a sink selector configured to select a sink within a computer software application, an output stream tracer configured to trace a character output stream leading to the sink within the computer software application, and determine an injection context of the character output stream at the sink, where the injection context is predefined in association with a state of the character output stream at the sink, and a context action identifier configured to identify any actions that have been predefined in association with the identified injection context, and provide a report of the actions, where the sink selector, output stream tracer, and context action identifier are implemented in at least one of a) computer hardware, and b) computer software embodied in a physically-tangible computer-readable storage medium.

In another aspect of the invention a method is provided for injection context based static analysis of computer software applications, the method including selecting a sink within a computer software application, tracing a character output stream leading to the sink within the computer software application, determining an injection context of the character output stream at the sink, where the injection context is predefined in association with a state of the character output stream at the sink, identifying any actions that have been predefined in association with the identified injection context, and providing a report of the actions. A computer program product embodying the invention is also provided.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
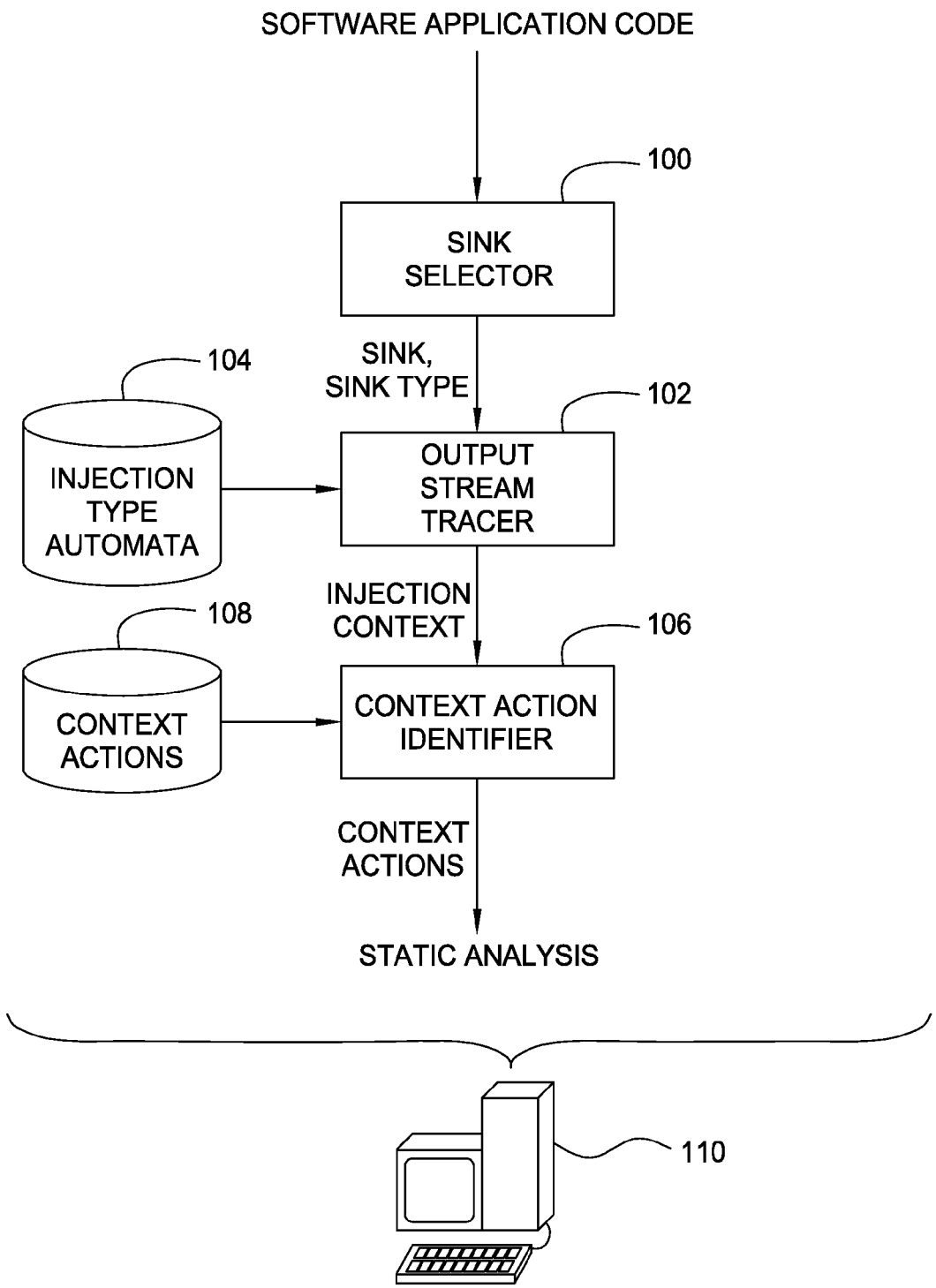
FIG. 1 is a conceptual illustration of a system for injection context based static analysis of computer software applications, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications that may occur to those skilled in the art that, while not specifically shown herein, are nevertheless within the spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a conceptual illustration of a system for injection context based static analysis of computer software applications, constructed and operative in accordance with an embodiment of the invention. In the system of FIG. 1, static analysis is performed as follows on the instructions of a computer software application, such as where the instructions are in the form of source code or bytecode. As shown, the system includes a sink selector 100, which may identify and select data sinks in the software application. Generally, a sink is an element of a software application that receives input from a source in the application. In one embodiment, a sink includes one or more lines of code that are bound to external data received from a data source. As a simple example, a computer program may receive an input data string from an external data source (i.e., the data is received from an entity outside the software application), and then output the received data string to a display. In this example, the line of code that prints the received data string would be a data sink, as it is directly tied to the input string received from the data source.

The sink selector 100 may select a sink within the computer software application. The sink may be predefined in the computer software application. In one embodiment, the sink selector 100 is configured to identify sinks using any known technique. Sink selector 100 may also use conventional techniques to identify the type of sink selected, such as hypertext markup language (HTML)-type or structured query language (SQL)-type. Alternatively, sink selector 100 may first select a given sink type, such as the direction of a user of the present invention, whereupon sink selector 100 selects a sink of the selected sink type.

An output stream tracer 102 may trace a character output stream leading to the sink within the computer software application. Output stream tracer 102 may select from a set of predefined injection type automata 104 an automaton that has been predefined for the sink type. Output stream tracer 102 may traverse the selected automaton by testing each character in the character output stream in view of the automaton's transition conditions, beginning with the first character at a selected point along the character output stream, such as the origin of the character output stream, and ending with the last character in the character output stream at the selected sink. The state node within the selected automaton to which output stream tracer 102 last transitioned may represent the context of the character output stream at the selected sink. Where the sink is analyzed to determine its vulnerability to code injection attacks, this context may represent the injection context of the sink.

A context action identifier 106 may identify any actions associated with the identified injection context. In one embodiment, the context action identifier 106 identifies any actions that have been predefined in association with the identified injection context in a set of context actions 108. Such context actions may include, but are not limited to:

suggesting the use of one or more predefined code sanitizers known to protect against code injection attacks that exploit the identified injection context;

suggesting the use of one or more predefined remediation actions known to protect against code injection attacks that exploit the identified injection context; and suggesting the use of one or more predefined exploits and payload characteristics known for testing an application's vulnerability to code injection attacks that exploit the identified injection context.

Context action identifier 106 may provide the results of the static analysis using any known reporting technique by identifying the selected sink, indicating the sink type, indicating the identified injection context, and enumerating the identified context actions.

Sink selector 100, output stream tracer 102, and context action identifier 106 may be configured to perform their described functions with respect to any sink within the computer software application. In one embodiment, the sink selector 100, output stream tracer 102, and context action identifier 106 are configured to perform their described functions with respect to every sink within the computer software application.

Any of the elements shown in FIG. 1 may be implemented as a computer program product embodied in a computer-readable medium, such as in the form of computer program instructions stored on magnetic, optical, or other physical storage media, and/or embedded within computer hardware, and may be executed by one or more computers, such as by a computer 110.

Figure 2:
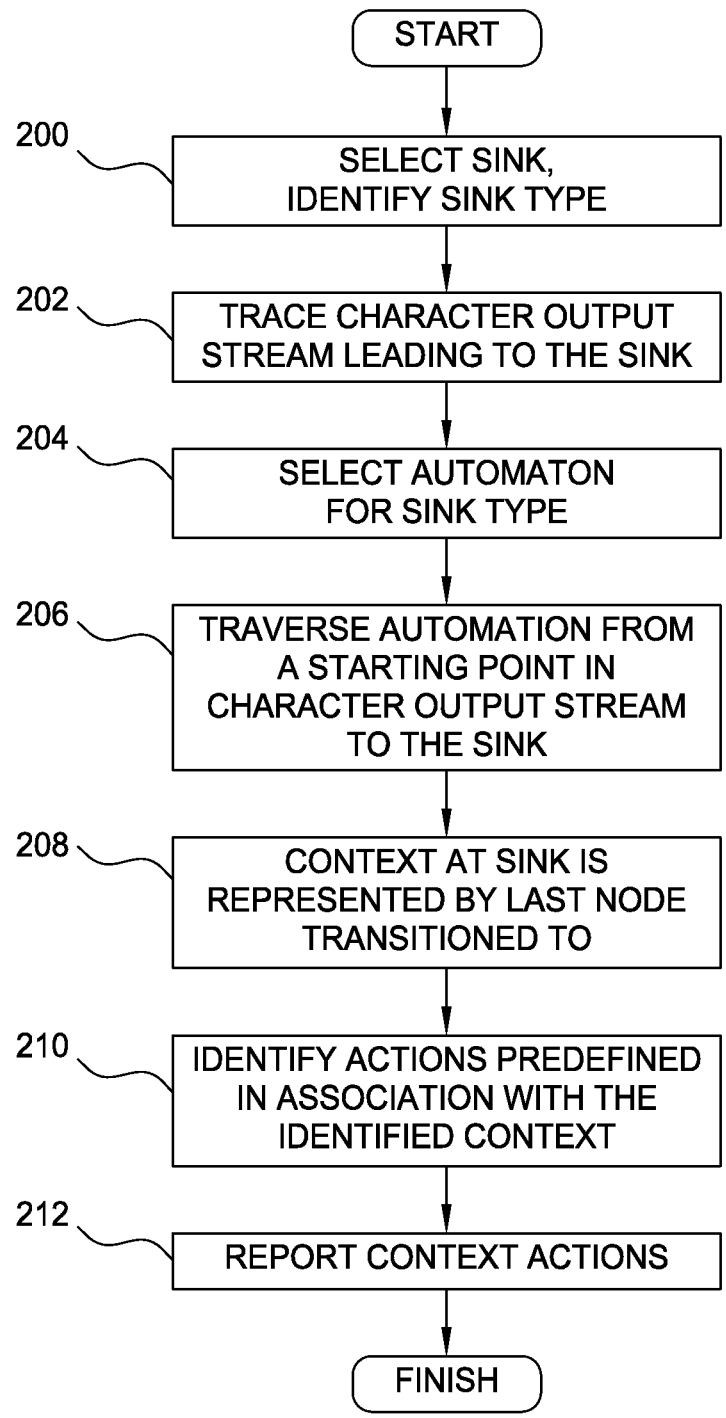
FIG. 2 is a flowchart illustration of an exemplary method of operation of the system of FIG. 1, operative in accordance with an embodiment of the invention.

Reference is now made to FIG. 2, which is a flowchart illustration of an exemplary method of operation of the system of FIG. 1, operative in accordance with an embodiment of the invention. In the method of FIG. 2, static analysis is performed on the instructions of a computer software application as follows. As shown, a sink is selected within the computer software application, and the type of sink that was selected is identified (step 200). Alternatively, a given sink type is first selected, whereupon a sink of the selected sink type is then selected. A character output stream leading to the sink within the computer software application is traced (step 202). An automaton that has been predefined for the sink type of the selected sink is selected (step 204). The selected automaton may be traversed by testing each character in the character output stream in view of the automaton's transition conditions, beginning with the first character at a selected point along the character output stream, such as the origin of the character output stream, and ending with the last character in the character output stream at the selected sink (step 206). The state node within the selected automaton last transitioned to represents the context of the character output stream at the selected sink (step 208). Actions that have been predefined in association with the identified context are identified (step 210) and reported with the results of the static analysis (step 212). The report may identify, for example, the selected sink, the sink type, and the identified injection context, as well as enumerate the identified context actions.

The system and method of FIGS. 1 and 2 may be understood within the context of the following exemplary scenario in which the static analysis of the present invention is applied to the following Java™ code:
1: PrintWriter out=response.getWriter( )
2: String taint=request.getParameter("taintedParam");
3: out.println("<HTML>");
4: out.println("<BODY>");
5: out.println(variable);
6: out.print("<IMG src='a.jpg' alt='");
7: out.print(taint); // Cross-Site Scripting
8: out.println("'</IMG>");
9: out.println("</BODY></HTML>");

In this example, the code at line 7 is a potential Cross-Site Scripting sink, and the println/print calls preceding line 7 write data to the character output stream leading to the sink. A Cross-Site Scripting automaton is selected for evaluating the character output stream starting at one or more different points in the character output stream, where each starting point is evaluated separately using the selected automaton. When evaluating the character output stream, various heuristics may be employed, such as, but not limited to:

A) If the outcome of a transition condition is undefined for a given portion of the character output stream being evaluated, it may be assumed that the portion does not change the current context (i.e., self-loop within the automaton);

B) If the portion of the character output stream being evaluated is predefined as being a "well known" token, an automatic transition to a specific context may be performed notwithstanding the current context. For example, an automatic transition to the initial state from any current state may be performed when the portion of the character output stream being evaluated is "<BODY>" when employing a Cross-Site Scripting automaton.

Thus, applying heuristic B may result in the transition to the initial state at line 5, whereas applying heuristics A may result in the context at line 6 remaining the same. The transition from line 6 to line 7 may result in the transition from an "Inside Tag" context to an "Inside attribute value" context. Thus, the static analysis of the present invention may determine that the data written in the character output stream when code execution reaches the sink conforms to the following pattern:

```
<HTML><BODY>.*<IMG src='a.jpg' alt='
``` and has a context of "Inside attribute value."

The context actions predefined for an "Inside attribute value" context of a Cross-Site Scripting sink may, for example, indicate that the correct sanitization for the context is to HTML encode the characters < >', that the following attack vectors may be used when testing the application:

```
' onload=alert(1) foo='bar
bar'><script>alert(1)</script><img src='a.jpg
``` and that the following attack vector would not be useful for testing the identified code injection context:

```
<script>alert(1)</script>
```

Figure 3:
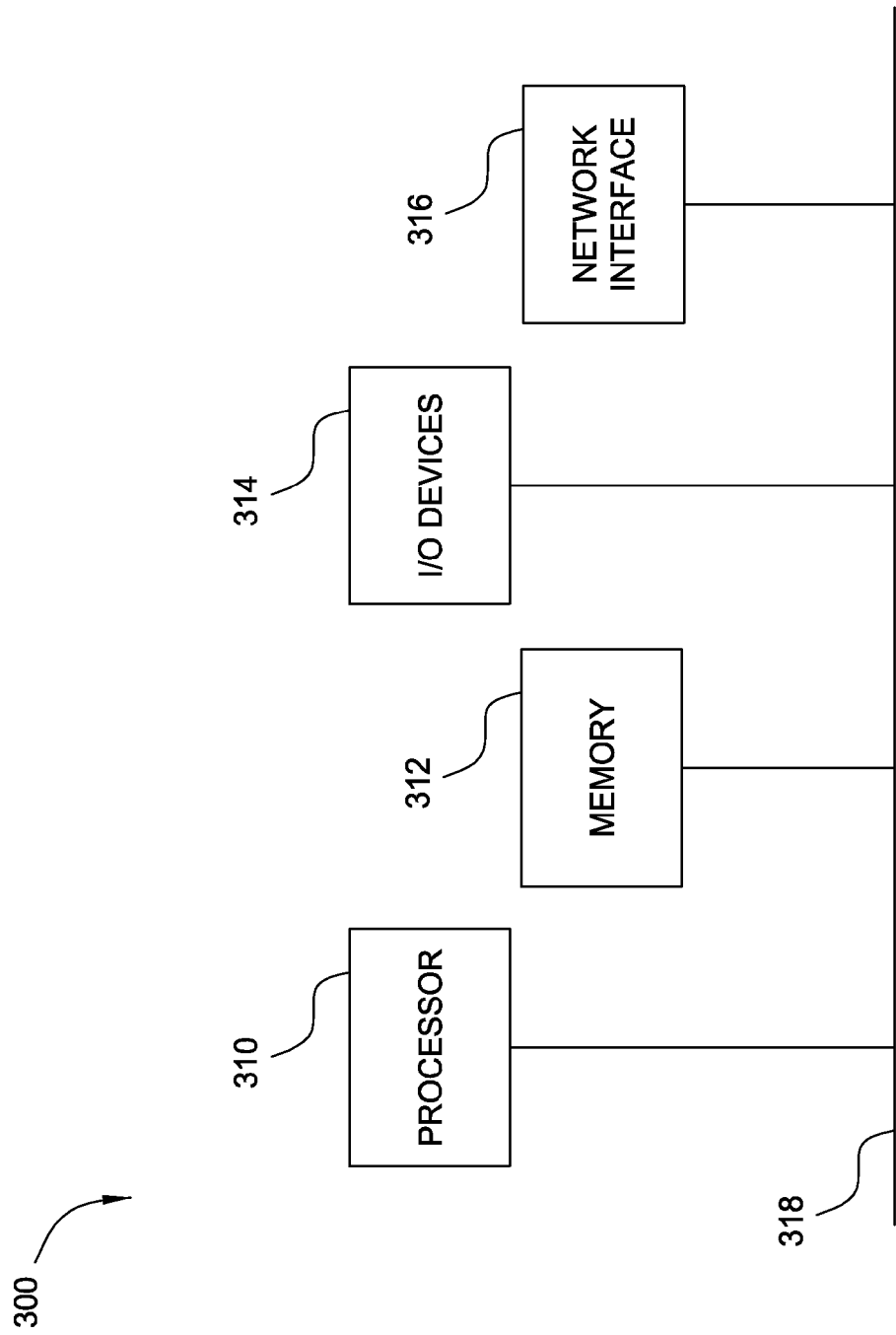
FIG. 3 is a block diagram illustrating an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of the drawing figures shown and described herein) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

Furthermore, while the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system for injection context based static analysis of computer software applications, comprising:
    a sink selector configured to select a sink within a computer software application of the computer system, the sink comprising one or more lines of computer code within the computer software application, the one or more lines of code being bound to external data comprising a character output stream received from a data source that is external to the computer system, wherein said sink selector is configured to identify a sink type associated with said sink, the sink type comprising one of hypertext markup language (HTML), structured query language (SQL), and cross-site scripting;
    an output stream tracer configured to:
        based on selection of the sink, trace the character output stream leading to said sink within said computer software application; and
        determine an injection context of said character output stream at said sink, wherein said injection context has a predefined association with a state of said character output stream at said sink; and
    a context action identifier configured to:
        identify one or more actions that are associated with said determined injection context; and
        provide a report including the identified one or more actions,
    wherein said sink selector, output stream tracer, and context action identifier are implemented in at least one of: a) computer hardware, and b) computer software embodied in a physically-tangible computer-readable storage medium.

2. The system according to claim 1 wherein said output stream tracer is configured to determine said injection context by:
    selecting an automaton that has been predefined for a sink type with which said sink is associated, the sink type comprising one of hypertext markup language (HTML), structured query language (SQL), and cross-site scripting; and
    traversing said automaton by testing a plurality of characters in said character output stream in view of at least one transition condition predefined for said automaton.

3. The system according to claim 2 wherein said testing begins at the origin of said character output stream.

4. The system according to claim 2 wherein said testing ends with a last character in said character output stream at said sink.

5. The system according to claim 1 wherein said one or more actions include suggesting a predefined code sanitizer to protect against code injection attacks that exploit said identified injection context.

6. The system according to claim 1 wherein said one or more actions include suggesting the use of one or more predefined remediation actions to protect against code injection attacks that use the identified injection context.

7. The system according to claim 1 wherein said one or more actions include suggesting the use of one or more predefined exploits and payload characteristics for testing vulnerability of an application to code injection attacks that use the identified injection context.

8. The system according to claim 1 wherein said report identifies said sink, indicates a sink type, the sink type comprising one of hypertext markup language (HTML), structured query language (SQL), and cross-site scripting, associated with said sink, indicates said identified injection context, and enumerates said identified actions.

9. A method for injection context based static analysis of computer software applications, the method comprising:
    selecting a sink within a computer software application of a computer system, the sink comprising one or more lines of computer code within the computer software application, the one or more lines of code being bound to external data comprising a character output stream received from a data source that is external to the computer system;
    identifying a sink type associated with said sink, the sink type comprising one of hypertext markup language (HTML), structured query language (SQL), and cross-site scripting;
    based on selection of the sink, tracing the character output stream leading to said sink within said computer software application;
    determining an injection context of said character output stream at said sink, wherein said injection context has a predefined association with a state of said character output stream at said sink;
    identifying one or more actions that are associated with said identified injection context; and
    providing a report of said one or more actions.

10. The method according to claim 9 wherein determining the injection context comprises:
    selecting an automaton that has been predefined for a sink type with which said sink is associated, the sink type comprising one of hypertext markup language (HTML), structured query language (SQL), and cross-site scripting; and
    traversing said automaton by testing a plurality of characters in said character output stream in view of at least one transition condition predefined for said automaton.

11. The method according to claim 10 wherein said testing begins at the origin of said character output stream.

12. The method according to claim 10 wherein said testing ends with a last character in said character output stream at said sink.

13. The method according to claim 9 wherein identifying one or more actions comprises:
    identifying one or more actions that include suggesting the use of a predefined code sanitizer to protect against code injection attacks that exploit said identified injection context.

14. The method according to claim 9 wherein identifying one or more actions comprises:
    identifying one or more actions that include suggesting the use of one or more predefined remediation actions to protect against code injection attacks that use the identified injection context.

15. The method according to claim 9 wherein identifying one or more actions comprises:
    identifying one or more actions that include suggesting the use of one or more predefined exploits and payload characteristics for testing vulnerability of an application to code injection attacks that use the identified injection context.

16. The method according to claim 9 wherein providing the report of said one or more actions comprises:
    providing said report identifying said sink, indicating a sink type, the sink type comprising one of hypertext markup language (HTML), structured query language (SQL), and cross-site scripting, associated with said sink, indicating said identified injection context, and enumerating said identified actions.

17. A computer program product for injection context based static analysis of computer software applications, the computer program product comprising:
    a computer-readable storage medium; and
    computer-readable program code embodied in said computer-readable storage medium, wherein said computer-readable program code is configured to:
        select a sink within a computer software application of a computer system, the sink comprising one or more lines of computer code within the computer software application, the one or more lines of code being bound to external data comprising a character output stream received from a data source that is external to the computer system;
        identify a sink type associated with said sink, the sink type comprising one of hypertext markup language (HTML), structured query language (SQL), and cross-site scripting;
        based on selection of the sink, trace the character output stream leading to said sink within said computer software application;
        determine an injection context of said character output stream at said sink, wherein said injection context has a predefined association with a state of said character output stream at said sink;
        identify one or more actions associated with said identified injection context; and
        provide a report of said one or more actions.

18. The system according to claim 1, wherein the sink comprises one or more lines of computer code configured to print the character output stream to a display of the computer system.

* * * * *